(12) United States Patent
Keeney et al.

(10) Patent No.: US 6,279,987 B1
(45) Date of Patent: Aug. 28, 2001

(54) CONTINUOUS COLORED SEAL

(75) Inventors: John D. Keeney, Fremont; Nathan W. Ellis, Brentwood, both of NH (US)

(73) Assignee: Hutchinson Sealing Systems, Inc., Farmington Hills, MI (US)

( * ) Notice: Subject to any disclaimer, the term of this patent is extended or adjusted under 35 U.S.C. 154(b) by 0 days.

(21) Appl. No.: 09/567,287

(22) Filed: May 8, 2000

(51) Int. Cl.[7] .................................................. B60J 10/02
(52) U.S. Cl. ................................. 296/146.9; 296/146.2; 49/490.1
(58) Field of Search ............................. 296/146.9, 146.2, 296/146.3, 206; 49/475.1, 479.1, 490.1

(56) References Cited

U.S. PATENT DOCUMENTS

| | | | |
|---|---|---|---|
| 4,786,931 | * | 11/1988 | Kirkwood . |
| 5,014,464 | * | 5/1991 | Dupuy et al. . |
| 5,123,693 | * | 6/1992 | Karashima et al. . |
| 5,147,105 | * | 9/1992 | Ono et al. . |
| 5,343,609 | * | 9/1994 | McManus . |
| 5,352,496 | * | 10/1994 | Jackson ........................... 49/490.1 X |
| 5,396,733 | | 3/1995 | Dupuy . |
| 5,437,124 | * | 8/1995 | Ahlfeld et al. .................. 49/490.1 X |
| 5,475,947 | * | 12/1995 | Dupuy .................................. 49/490.1 |
| 5,618,593 | | 4/1997 | Belser et al. . |
| 5,628,150 | * | 5/1997 | Mesnel ............................. 49/490.1 X |
| 5,702,148 | * | 12/1997 | Vaughan et al. .................. 296/146.9 |
| 5,817,414 | * | 10/1998 | Ando ............................. 296/146.9 X |
| 6,007,140 | * | 12/1999 | Heitmann et al. ................ 296/146.9 |
| 6,023,888 | * | 2/2000 | Dover ............................. 49/490.1 X |

* cited by examiner

Primary Examiner—Joseph D. Pape
(74) Attorney, Agent, or Firm—Dykema Gossett PLLC

(57) ABSTRACT

A weather strip molding for sealing a movable glass panel in an automotive vehicle is provided. The weather strip molding is placed within a window opening having at least two intersecting boundaries along a peripheral edge of the window opening. The weather strip molding is continuous between the first and second boundaries. The weather strip molding includes a retention portion for connecting the weather strip to a rigid structure adjacent to one of the window opening boundaries. The weather strip molding also includes a sealing wing connected with the retention portion having a colored first surface for sealing against the movable glass panel. The color of the sealing first surface can be coordinated with the interior trim of the vehicle as desired.

10 Claims, 2 Drawing Sheets

CONTINUOUS COLORED SEAL

FIELD OF THE INVENTION

The present invention relates to weather stripping in automotive vehicles for sealing movable glass windows to keep air, noise, dust and precipitation from the exterior of the vehicle from entering through the window opening when a movable panel of window glass is closing the opening. More particularly, the present invention relates to a continuous weather strip wherein the sealing portion of the weather stripping can be colored to enhance the aesthetics of the interior of the automotive vehicle.

BACKGROUND OF THE INVENTION

Most automotive doors have a body envelope created by two generally-parallel spaced-apart inner and outer door panels. A top surface of the inner and outer door panels is often referred to as the belt line. An extendable panel (pane) of window glass is nested between the door panels. A window regulator is provided for selectively moving the glass panel in and out of the door envelope to open and close the window opening of the door. In many vehicles, the vehicle door has a door frame above the belt line for enclosing the window opening and supporting the glass panel in the uppermost position. The door frame has a seal along the top, typically called weather stripping or weather strip, which is connected with the door window frame to seal the lateral and upper edges of the window glass when the window glass is in its uppermost position.

The front and rear door window openings typically have one lateral boundary formed by a post which is adjacent to the B-pillar of the vehicle. The post is typically fixed to the door and typically has a longitudinal axis which is parallel with the axis of travel of the window panel. The post is typically a channel-shaped member having a head which aligns the lateral edge of the window glass panel. The post has two legs which extend in the fore and aft direction of the vehicle. The legs of the post align the window panel in a transverse direction of the axis of travel of the window panel. An interior leg of the post is adjacent to the interior of the vehicle and prevents the window glass from being pushed into the interior of the door opening. The top of the post is connected with or extends to a header region of the door window frame which provides an upper border of the window opening. The header region of the front window frame is joined with an A-pillar region of the door opening. The header region of the rear window frame is joined with a C-pillar region of the window opening (in some vehicles an opera window). Prior to the present invention, typical automotive sealing systems for door openings had combinations of extrusions which were molded together at the intersections between the header portion and pillar portions of the window opening. The extrusions also had dissimilar crosssections. Gaps and mismatches at the intersecting transition areas allowed infiltration of noise, water and dust. It would be desirable to provide a seal which would eliminate the gaps and mismatches at the transition areas.

In the past, most weather stripping has been supplied in one color, that being black. In recent years attempts have been made to improve the aesthetics of vehicles. Accordingly, it is desirable to provide a seal which can be color coordinated or color matched with the color of the interior of the vehicle.

SUMMARY OF THE INVENTION

To make manifest the above noted desires, the revelation of the present invention is brought forth. In a preferred embodiment the present invention brings forth a continuous weather strip molding which has a generally U-shaped retention portion with two legs extending from a juxtaposed base portion. The retention portion of the weather strip is fitted onto the rigid frame structure of the door window opening. The weather strip molding has a sealing wing which is connected with the retention portion and extends from the retention base portion. The sealing wing has a sealing surface which seals against the movable glass panel. Continuous with the sealing wing is a concealment wing which is adjacent to the leg of the retention portion that is opposite the movable glass panel. The concealment wing conceals the adjacent leg of the retention portion from view from the interior of the vehicle. The first and second surfaces of the sealing wing and concealment wing are provided with color in the form of flock, laminate tape, low friction coating or in the polymer itself. The sealing wing and concealment wing are continuous from a belt line of the window opening up the B-pillar post, across the header region and down the A-pillar (front) or C-pillar (rear). The seal can be color coordinated or color matched with the interior color of the vehicle. Optionally the sealing wing, concealment wing and retention portion are formed as a common extrusion which can also be color matched.

It is an object of the present invention to provide a continuous seal from belt line to belt line. It is an object of the present invention to provide a continuous seal which can be color coordinated or matched with the interior color of an automotive vehicle.

Other objects of the present invention can be discovered by a review of the accompanying drawings and the detailed description of the invention.

DETAILED DESCRIPTION OF THE INVENTION

Figure 1:
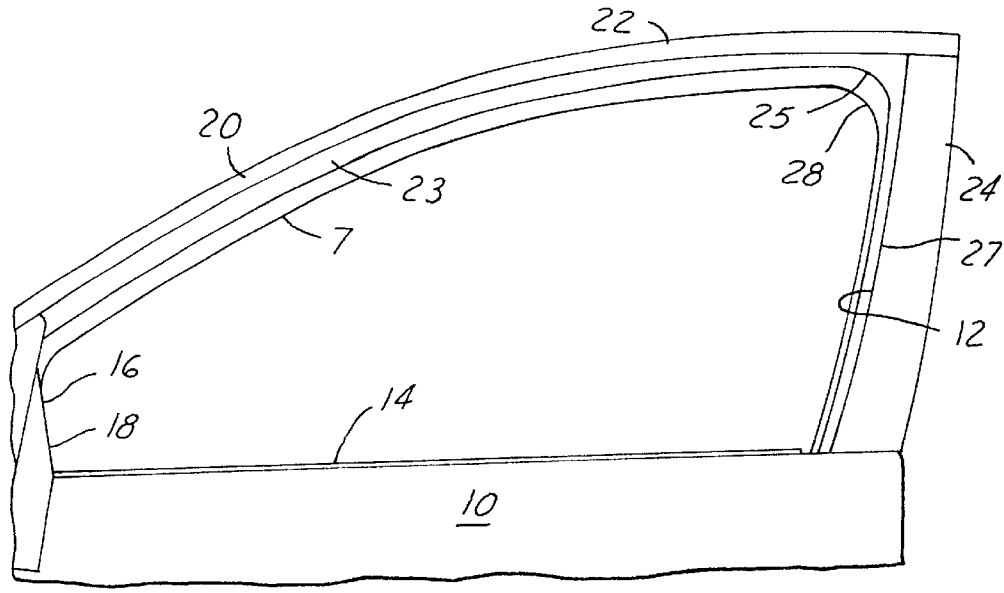
FIG. 1 is a side elevational view of a continuous seal shown in the environment of a front door in an automotive vehicle.

FIG. 1 illustrates a partial side elevational view of a front door 10. The front door 10 has a door opening 12. A belt line 14 provides the bottom boundary of the door opening. Connecting with the belt line 14 is an A-pillar 16 having a lower, generally vertical region 18 and an incline region 20. The incline region 20 of the A-pillar portion of the door frame blends into a header region 22. The door window frame has at its rear end a B-pillar portion 24 which is adjacent to the B-pillar portion of the vehicle. A movable glass window (not shown) is translatable from a position beneath the belt line to an uppermost position closing the door opening 12. Positioned within the door opening 12 along the header and A-pillar sections of the window frame opening is a header seal 23. The header seal at a transitioned area 25 is connected with a B-pillar glass run channel seal 27. The header seal 23 and the B-pillar glass run channel seal 27 typically are both black in color. Positioned radially inward from the header seal 23 and the B-pillar channel seal 27 is the continuous seal 7 of the present invention. The continuous seal 7 extends from the A-pillar portion of the window frame into the header portion 22 of the window frame through a transitioned area 28 and then down to the belt line 14 adjacent the B-pillar portion 24 of the window frame. The continuous seal 7 is one continuous extrusion having a generally constant cross-sectional area and therefore does not have any gaps or intersections which can allow for the infiltration of noise, dust or precipitation.

Figure 2:
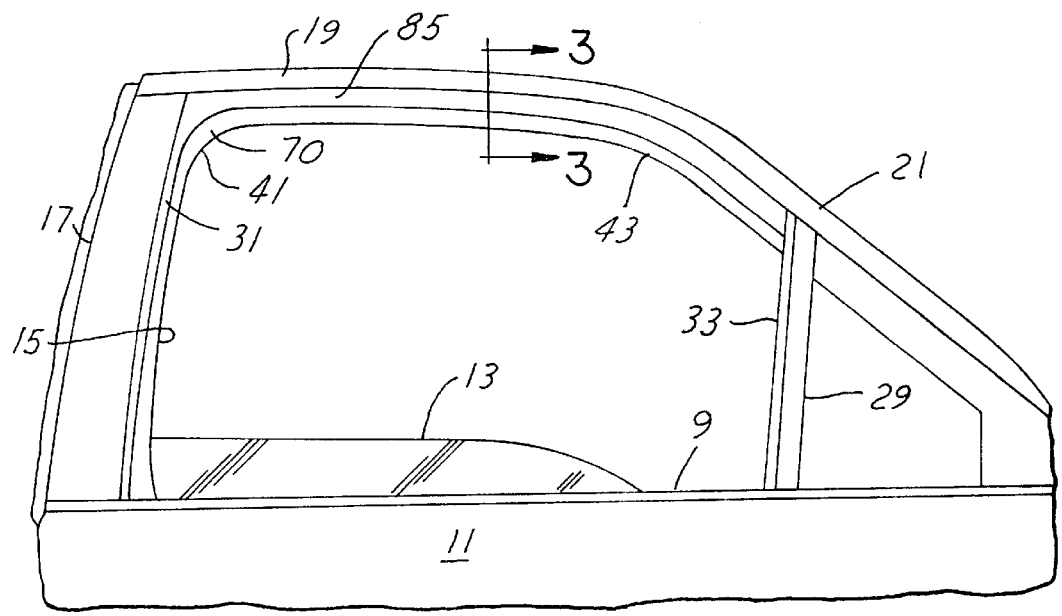
FIG. 2 is a side elevational view of a continuous seal shown in the environment of a rear door in an automotive vehicle.
Figure 3:
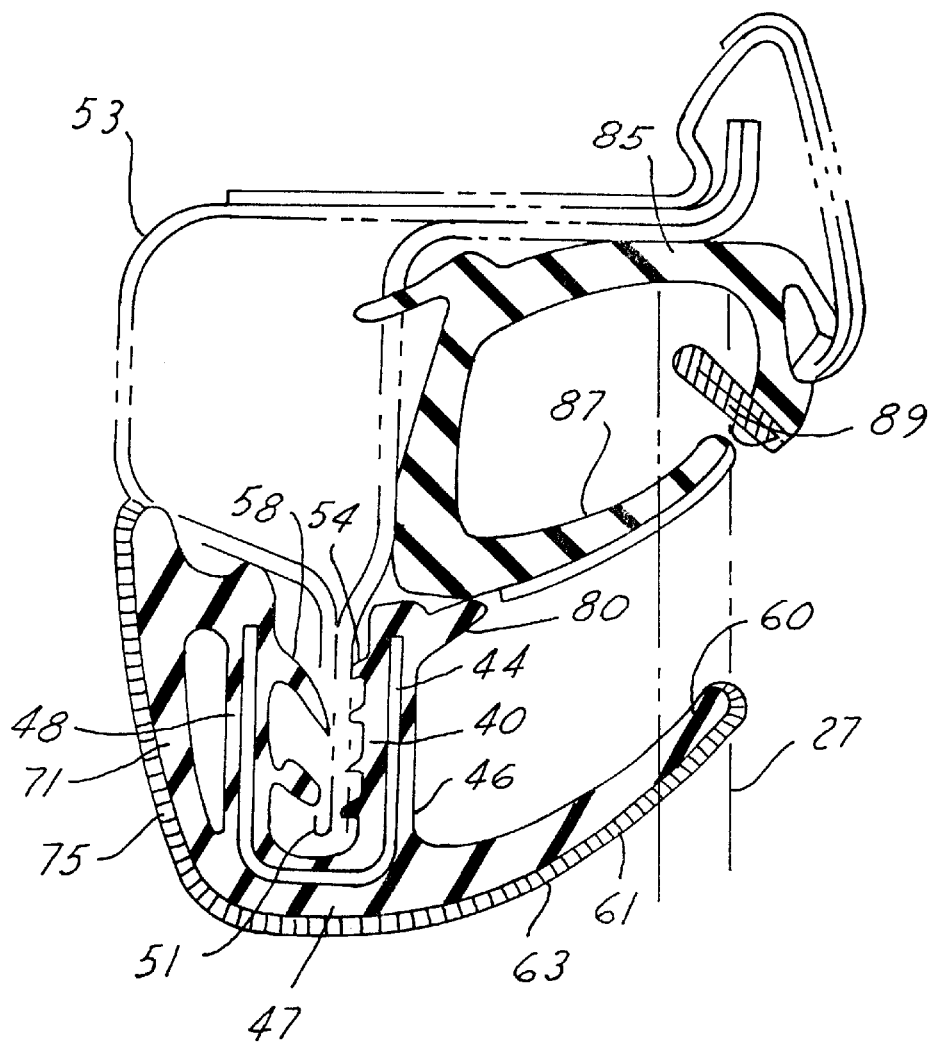
FIG. 3 is a sectional view along lines 3—3 of FIG. 2.

Referring to FIGS. 2 and 3, a rear door 11 having an extendable window panel 13 has a door opening 15 provided by a B-pillar portion of the window frame 17. The B-pillar portion 17 is joined to a header portion 19 and a C-pillar portion 21. The C-pillar portion 21 extends downward and has an intersection (not shown) with the belt line 9 of the door. In the rear door 11, the rear border of the window opening is provided by a division post 29. The B-pillar post 17 has a channel seal 31 which connects with a header seal 85. The header seal 85 is joined with a division post seal 33. Radially inward from the seals 31, 33, 85 is a continuous seal 70 according to the present invention. The continuous seal 70 extends from the belt line 9 adjacent to B-pillar 17, the header 19 and the C-pillar 21 back to the belt line 9. The continuous seal 70 extends through intersecting corner transition areas 41 and 43 and extends behind the division post 29. Hence the term "continuous" is utilized.

Referring to FIG. 3, the continuous seal 70 has a retention portion 40. The retention portion 40 has a U-shaped metal reinforcement 44. The retention portion 40 has an exterior leg 46 and an interior leg 48. The retention portion legs 46, 48 extend from a juxtaposed retention base portion 47. The retention portion 40 is pressed over (or as shown in FIG. 3 pressed upwards onto) a descending flange 51 which is a rigid structure provided by the upper frame 53 of a header portion of the door window opening frame. To help retain the retention portion 40 on the rigid structural flange 51 the retention portion 40 has interior extruded barbs 54 and 58. The continuous seal 70 has a sealing wing 60 connected to the retention portion 40 and has extending therefrom the base portion 47. The sealing wing 60 typically will be extruded with the retention portion 40 and will have a durometer between 40 and 90, preferably 70 (Shore A). The sealing wing has a first surface 61 with a low friction material 63 for sealing against the glass panel 27. The low friction material 63 on the first surface 61 will typically be color coordinated or color matched with the interior trim colors of the vehicle. The low friction material 63 is provided by laminate tape, flock or low friction coating. The low friction coating can be applied by the laminate tape or directly on the sealing wing 60. Additionally, the laminate tape itself may comprise the low friction material.

The continuous seal 70 also has a concealment wing 71. The concealment wing 71 is connected to and extends from the retention base portion 47 and is more adjacent to the leg 48 which is opposite the glass panel 27. The concealment wing 71 has a second surface 75 which is generally continuous with the first surface 61 and is also colored by tape, flock, low friction coating or by pigmentation (natural or added) of the polymer. Accordingly surface 75 provides two aesthetic functions. The first function is to conceal the carrier portion leg 48 from view of an interior occupant of the vehicle. The second function is to provide a colored surface which is either color coordinated or color matched with the interior colors of the vehicle.

Typically the sealing wing 60 and concealment wing 71 will be a common extrusion with the retention portion 40. The continuous seal 70 also has a close out lip 80. The close out lip 80 aids in the retention of a header seal 85. The header seal 85 has a flocked sealing wing 87 which also seals the extreme upper interior surface of the movable glass panel 27. Additionally the header seal 85 has an exterior flocked sealing wing 89 which seals an exterior side of the glass panel 27. The continuous seal sealing wing 60 obscures virtually any view of the header seal 85 from the interior of the vehicle. If desired, the extrusion of the sealing wing 60 retention portion 40 and concealment wing 75 can be pigmented to match the color of material 63.

Although the invention has been described in connection with specific embodiments thereof, it is evident that many alternatives, modifications and variations will be apparent to those skilled in the art in light of the foregoing description. Accordingly, it is intended to embrace all such alternatives, modifications and variations which fall within the spirit and broad scope of the accompanying claims.

We claim:

1. A weather strip molding for sealing an interior surface of a movable glass panel in a door of an automotive vehicle with a window frame with a window opening having at least two intersecting boundaries along a peripheral edge of said frame window opening, said weather strip molding being capable of being continuous from said first and second boundaries, said weather strip molding comprising;

a retention portion for connecting said weather strip to said door window frame adjacent to one of said frame window opening boundaries, said retention portion being generally U-shaped legs extending from a juxtaposed base portion;

a sealing wing connected with and extending from said retention base portion, said sealing wing having a first non-black colored flocked surface for sealing against said interior surface of said movable glass panel; and a concealment wing connected with and extending from said retention base portion, said concealment wing having a second non-black colored flocked surface for facing an interior of said automotive vehicle away from said movable glass panel and said concealment wing concealing an adjacent leg of said retention portion from view and wherein said sealing wing is continuous with said concealment wing.

2. A weather strip molding for an automotive vehicle as described in claim 1 wherein said color of said first surface is supplied by a flocked laminate tape applied on said first surface.

3. A weather strip molding for an automotive vehicle as described in claim 2 wherein said laminate tape has additionally applied thereto a low friction coating.

4. A weather strip molding for an automotive vehicle as described in claim 1 wherein said sealing wing is color pigmented to match the color of said first surface.

5. A weather strip molding for an automotive vehicle as described in claim 1 wherein said retention portion and said sealing wing are formed as a common extrusion.

6. A weather strip molding for an automotive vehicle as described in claim 1 wherein said second surface is colored to match said first surface.

7. A weather strip molding for an automotive vehicle as described in claim 1 wherein said first and second surfaces are provided by a common laminate tape.

8. A weather strip molding for an automotive vehicle as described in claim 1 with a durometer between 50 and 90 Shore A.

9. A weather strip molding for sealing an interior surface of a movable glass panel in a door of an automotive vehicle with a window frame with a window opening having at least two intersecting boundaries along a peripheral edge of said window opening, said weather strip molding being continuous from said first and second boundaries, said weather strip molding comprising;

a retention portion for connecting said weather strip to said door window frame adjacent to one of said frame window opening boundaries, said retention portion being generally U-shaped legs extending from a juxtaposed base portion;

a sealing wing connected with and extending from said retention base portion, said sealing wing having a first colored flocked surface for sealing against said interior surface of said movable glass panel; and a concealment wing connected with and extending from said retention base portion, said concealment wing having a second flocked surface for facing an interior of said automotive vehicle away from said movable glass panel and said second surface having a color which is matched with said color of said first surface and said concealment wing concealing an adjacent leg of said retention portion from view and wherein said sealing wing is continuous with said concealment wing and said concealment wing is formed as a common extrusion with said sealing wing and said retention portion and said color of said first and second surfaces is provided by a laminate having said colored flock connected thereto.

10. A weather strip molding for an automotive vehicle as described in claim 9 wherein said retention portion is pigmented to match said color of said first surface.

\* \* \* \* \*